United States Patent [19]

Craddy

[11] E Re. 29,713

[45] Reissued Aug. 1, 1978

[54] ROTARY CUTTER DRUMS

[75] Inventor: Richard Adrian Craddy, Alveston, England

[73] Assignee: Masson Scott Thrissell Engineering Limited, Bristol, Great Britain

[21] Appl. No.: 801,193

[22] Filed: May 27, 1977

Related U.S. Patent Documents

Reissue of:

[64] Patent No.: 4,005,627
Issued: Feb. 1, 1977
Appl. No.: 643,269
Filed: Dec. 22, 1975

[30] Foreign Application Priority Data

Jan. 17, 1975 [GB] United Kingdom ..... 2077/75

[51] Int. Cl.[2] ..... B26D 1/36
[52] U.S. Cl. ..... 83/674; 83/347
[58] Field of Search ..... 83/663, 674, 116, 117, 83/346, 345, 347

[56] References Cited

U.S. PATENT DOCUMENTS

| | | | |
|---|---|---|---|
| 3,438,835 | 4/1969 | Chen et al. | 83/116 X |
| 3,598,010 | 8/1971 | Chambon | 83/674 X |

*Primary Examiner*—Willie G. Abercrombie
*Attorney, Agent, or Firm*—Seidel, Gonda & Goldhammer

[57] ABSTRACT

The invention provides a rotary cutter drum for use in apparatus for cutting continuous web material into discrete lengths in which the polar moment of inertia is kept to a minimum. The drum consists of a prefabricated metal load bearing member to which a block, on which a knife blade is mounted, and a balancing member are secured. The load bearing member, the block and the balancing member are then covered in a lightweight material such as an integral skin polyurethane rigid foam material arranged so that the outer surface of the whole drum is rotational symmetrical, the surface being interrupted to allow for the mounting of the knife blade.

6 Claims, 1 Drawing Figure

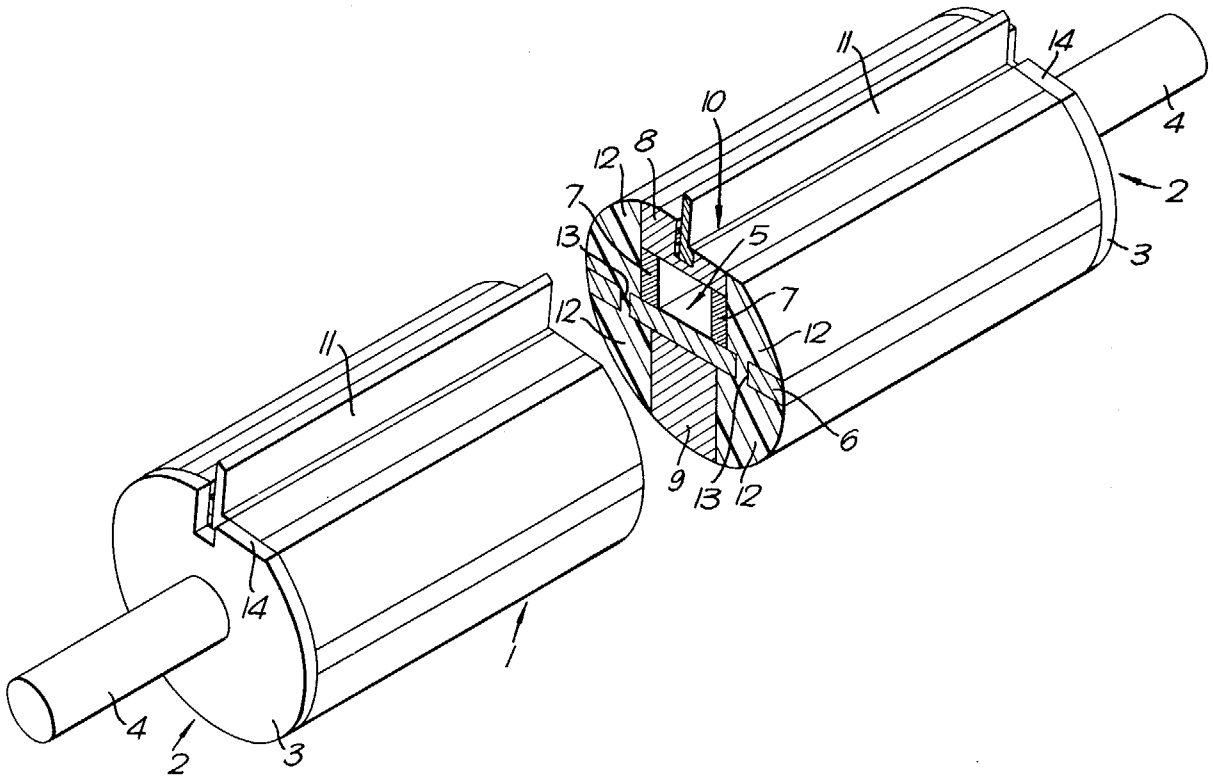
4
2
3
14
11
10
8
12
7
13
5
6
9
1

ROTARY CUTTER DRUMS

Matter enclosed in heavy brackets [ ] appears in the original patent but forms no part of this reissue specification; matter printed in italics indicates the additions made by reissue.

This invention concerns improvements in or relating to rotary cutter drums and in particular to cutter drums for use in apparatus for cutting continuous webs of material into discrete lengths.

As said cutter drums, e.g. in paper cutters, are required to operate at high speeds it has been found desirable to form their cutter surfaces so as to create minimum air turbulence, to avoid disturbance of the web adjacent to the cutting region. Also, it is advantageous to keep the polar moment of inertia of such drums to a minimum.

It is an object of the present invention to provide a form of cutter drum which while relatively simple satisfies both the above requirements.

According to the present invention there is provided a rotary cutter drum for use in apparatus for cutting continuous web material into discrete lengths including a load carrying member, means for attachment of a cutter blade thereto, and non-load carrying light-weight material secured to said load carrying member and so arranged that the whole forms a body whose outer surface is a surface of revolution, or otherwise rotationally symmetrical, interrupted as necessary to allow for the presence of such cutter blade.

Generally machines for cutting continuous web material into lengths operate at high speeds, so it is preferable that means is provided on said load carrying member to balance said cutter blade and said attachment means.

The cutter drum may further include a pair of end members between which said load carrying member and said attachment means extend, each of said end members being secured to one end of said load carrying member and said attachment means. Conveniently said attachment means may comprise a mounting block having a longitudinal recess formed therein and in which said cutter blade is mounted, said mounting block being secured to said load carrying member.

In a preferred form the load carrying member consists of a number of elements secured together, for example, by welding, and the use of a light-weight material for forming said body keeps to a minimum the polar moment of inertia of the cutter drum. Conveniently said light-weight material may be a rigid plastics foam, such as a structural polyurethane foam.

Where it is necessary to provide a drum in which the cutter blade has its cutting edge at such a radius from the rotational axis of said drum that it is not possible to attach said cutter blade directly to said load carrying member, means may be provided projecting from said load carrying member and to which said cutter blade is attached. In this construction the balancing means must also balance said projecting means and the light-weight material is secured to said load carrying member and said projecting means.

A cutter drum constructed according to the present invention enables the drum to be made with a smaller diameter than conventional drums, whilst retaining required stiffness of the drum. Consequently the polar moment of inertia of a drum according to the invention is less than that of a conventional drum.

A preferred embodiment of the invention will now be described by way of example with reference to the accompanying drawing which shows a rotary drum broken in two to show its internal details.

Referring to the drawing, a rotary drum 1 for use in a machine for cutting a continuous web of paper into discrete lengths has two ends members 2 each consisting of a disc 3 of steel plate from which extends a central stub shaft 4. Through one of the shafts 4 a rotary drive may be imparted to the drum 1, from a drive mechanism (not shown). A load carrying member 5 extends between and is fixed at opposite ends thereof, to the two discs 3. The member 5 consists of three elements, namely a transverse web 6 of steel plate having a width equal to the diameter of the discs 3, and a pair of secondary webs 7 of steel plate, secured to the webs 7 of the member 5 is a mounting block 8, and a bar 9 of steel is secured to the web 6 of member 5 diametrically opposite the mounting block 8, the bar 9 being used for balancing the mass of the drum 1 and increasing its stiffness. The various parts 6, 7, 8 and 9 are welded together and are also welded, at opposite ends, to the discs 3. A longitudinal recess 10 is then formed in the block 8 and discs 3, and the outer surfaces of the mounting block 8 and bar 9, and also the narrow longitudinal edges of the web 6, are machined to conform to the outer peripheral surface of the drum 1. A knive blade 11 is mounted in the recess 10 in any convenient known manner, the mounting block 8 and discs 3 being cut away, as shown at 14, to provide space for means (not shown) for holding the knife blade 11 in the recess 10. An example of a preferred mounting for the knife 11 is described and illustrated in U.S. Pat. application Ser. No. 481,865 filed 21st June 1974, now U.S. Pat. No. 3,935,774.

With the end members 2, load carrying member 5, block 8 and bar 9 constructed as described above, a rotary drum of low polar moment of inertia is provided, the member 5, block 8 and bar 9 providing adequate stiffness to the drum over its length. However, such a drum, because of its paddle wheel like shape in cross section, would cause considerable air turbulence when in use which would have a disturbing effect on the web of paper to be cut. In order to reduce this turbulence, without substantially increasing the polar moment of inertia of the drum, it has been found convenient to fill the spaces bounded by the web 6, and secondary webs 7 and block 8, and also the web 6 and the bar 9, between the discs 3, with a light-weight material 12, which may consist of, for example, a rigid plastics foam, such as a structural polyurethane foam, having an outer skin of adequate hardness and strength to withstand all normal usage. An example of a satisfactory material is integral skin polyurethane rigid foam type "Bibbicast RM400" produced by Bibby Chemicals Limited, of Accrington, England.

In order to fill the spaces mentioned above with foam, the entire welded assembly is placed in a closely fitting cylindrical mould and polyurethane plastics foam mix is introduced in any known manner, such as injection or gravity feed. If required, the welded assembly could be replaced by a suitable metal casting, but however the load carrying member is constructed, the inside surface of the cylindrical mould is coated with a suitable release agent prior to the foam material being poured into the mould. To ensure that the polyurethane foam bonds to the load carrying member 5 and discs 3, it is usually only necessary to provide a clean and grease free surface. However, should this prove difficult to achieve then mechanical bonding can be adopted such as roughening those surfaces of the parts 3, 6, 7, 8 and 9 contacted by the foam material. Alternatively objects around which the foam can key may be fixed to the surfaces of the load carrying member 5, block 8 and bar 9, or holes 13 can be provided in the transverse web 6 to join the two adjacent cavities. If damage occurs to the outer surface of the foam, or part of the foam has to be removed for some reason, then a repair can easily be achieved by placing a part mould over the affected area and introducing fresh foam material.

I claim:

1. A rotary cutter drum for use in apparatus for cutting continuous web material into discrete lengths including a load carrying member, means for attachment of a cutter blade thereto, and non-load carrying light-weight material secured to said load carrying member and so arranged that the whole forms a body whose outer surface is rotationally symmetrical, interrupted as necessary to allow for the presence of such cutter blade, in which means is provided on said load carrying member to balance said cutter blade and said attachment means.

2. A rotary cutter drum as claimed in claim 1 further including a pair of end members between which said load carrying member and said attachment means extend, each of said end members being secured to one end of said load carrying member and said attachment means.

3. A rotary cutter drum as claimed in claim 2 in which said load carrying member consists of a number of elements secured together.

4. A rotary cutter drum as claimed in claim 3 in which said attachment means comprises a mounting block having a longitudinal recess formed therein and in which said cutter blade is mounted, said mounting block being secured to said load carrying member.

5. A rotary cutter drum as claimed in claim 4 in which said light-weight material is a rigid plastics foam material.

6. A rotary cutter drum as claimed in claim 5 in which said rigid plastics foam material is a structural polyurethane foam.

* * * * *